Patented Sept. 14, 1943

2,329,470

UNITED STATES PATENT OFFICE 2,329,470

CHEESE COATING

James D. Ingle and Leon D. Mink, Chicago, Ill., assignors to Industrial Patents Corporation, Chicago, Ill., a corporation of Delaware No Drawing. Application April 10, 1939, Serial No. 267,175

3 Claims. (Cl. 260—734)

This invention relates to an improved wax composition particularly adapted for coating cheese.

One of the objects of this invention is to provide a new wax having a greater tensile strength and pliability than paraffin or wax-like substances.

Another object of this invention is to provide a wax which is pliable at low temperatures and is not tacky at temperatures as high as about 100 degrees F.

Another object of this invention is to provide a cheese coating wax having a sufficient tensile strength and pliability to permit the coating to be peeled from the cheese surface cleanly without breaking.

Other objects of this invention will be apparent from the description and claims which follow.

In the manufacture of cheese, curd is pressed in a mold which has been partially lined with cheesecloth. The shape of the mold depends upon the trade preference in the locality in which the product is to be marketed. It is usual to prepare cheese in the form of blocks or cylinders, most cheese being molded in the form of cylinders of varying sizes, such as midgets, twins, daisies, Cheddars, wheels and longhorns.

After the curd has been in the mold under pressure a sufficient time to permit the curd to set, it is removed and placed in a cooler at a temperature of from 40 degrees F. to 45 degrees F. for from one to two days until a partial rind has formed on the surface. The molded cheese is generally dipped in molten petroleum waxes, such as paraffin, or molten wax-like substances, at a temperature of about 220 degrees F. to form a protective coating on the surface, to prevent drying out of the cheese, and to prevent mold growth on the surface of the cheese. Mild cheese is usually aged for about sixty days and the better grades of cheese for extended periods which vary up to approximately two years.

The usual wax-like or paraffin coating becomes checked or broken during the storage and handling period, thereby exposing small areas of the cheese to the atmosphere. The usual paraffin or wax-like coating becomes quite brittle at cooler temperatures and the coating easily chips from the surface of the cheese. Cheese is an excellent media for mold growth and soon after checking or breaking of the coating, mold will appear on the surface of the cheese, resulting in musty flavors, poor appearance, and cheese losses due to trimming.

Certain types of cheese are marketed in blocks weighing from one-quarter pound to five pounds. These blocks are generally enclosed in a wrapper of coated paper, metal foil, cellulose films, and the like, or may be coated with paraffin. We have found that our wax composition is a very satisfactory coating for such blocks of cheese to replace the usual wrappers. The wax coating possesses all of the advantages of the wrappers and ordinary paraffin coatings without having any of their disadvantages. In the use of wrappers, it is impossible to secure an impervious wrapping since it is necessary to overlap or seam the wrappers. In the use of paraffin, the coating becomes checked or broken easily. Our wax provides an impervious coating which does not become checked or broken easily, and may be removed when desired with the ease attending the use of film wrappers.

The wax of the present invention may be employed for many uses and has been found particularly effective for coating cheese. The wax comprises a mixture of petroleum wax, such as paraffin, or other amorphous wax, such as beeswax, or a mixture of paraffin and amorphous wax, and a synthetic, hard, brittle resin made from rubber.

The synthetic rubber resin does not possess any of the original physical properties of rubber. It is a thermoplastic condensation derivative or product of rubber prepared by reacting rubber, in solution in an organic solvent immiscible in water, with a halide of an amphoteric metal, for example, stannic chloride, ferric chloride, or aluminum chloride. The resulting reaction product is poured into a large volume of water containing a reducing agent, for example, sodium sulfite, and the mixture is then agitated vigorously to produce a fine emulsion. The volatile solvent is then removed by steam distillation and the synthetic rubber resin precipitated in finely divided form. The preparation of this synthetic rubber resin is described in United States Patent No. 2,052,423, granted August 25, 1936.

We have found that the addition of the above described synthetic rubber resin to paraffin, other petroleum waxes, or amorphous waxes, such as beeswax, forms a wax having a greater tensile strength and a greater pliability over a longer temperature range than the usual paraffin or wax-like substances employed in coating cheese. The synthetic rubber resin also increases the hardness and toughness of the wax. This new wax will not crack or chip from the surface of cheese, although the temperature of the cheese and coating may be slightly above the freezing point of water. This new wax does not become sticky or tacky at temperatures as high as 100 degrees F. It is strongly adherent to the surfaces of objects to which it is applied, particularly cheese, and when applied to cheese, it penetrates into the small crevices and holes in the cheese surface, thereby excluding air and inhibiting the growth of mold on the surface of the cheese. Although this wax adheres strongly to the surface of cheese, it has sufficient tensile strength and pliability to permit it to be peeled from the cheese surface cleanly without breaking. In removing the coating from the cheese, the coating has sufficient tensile strength to also remove the small portions of wax which have penetrated into the crevices and holes.

In preparing the wax of our invention, the paraffin or other wax is heated to about 220 degrees F. and the desired amount of the finely divided synthetic rubber resin is added and mixed with the melted wax. Heating is then discontinued and the mixture is agitated vigorously until it begins to thicken. The mixture is then allowed to stand for from 15 minutes to 30 minutes. The rubber resin first swells and when the mixture is reheated to about 220 degrees F., a homogeneous liquid mass is formed.

The proportion of synthetic rubber resin which is added to the wax is dependent upon the wax, the initial properties of the wax, and the properties desired in the final wax. In the practice of our invention, satisfactory wax compositions may be prepared by adding up to about 30 per cent synthetic rubber resin to the wax. Since the rubber resin is relatively expensive, we prefer to employ only such amounts of the resin as are necessary to impart the desired properties to the wax. If too large a proportion of the synthetic resin is employed the wax composition becomes so hard that it cannot be melted at the temperatures employed in coating cheese.

For coating cheese, we prefer to employ a wax composition prepared by adding about 10 per cent synthetic rubber resin to 90 per cent wax, such as commercial paraffin.

In coating cheese according to our invention, the cylinder or block of curd which has been set aside for a day or two to permit a partial rind to form on the surface or the small block of cheese may be dipped into the wax-synthetic rubber resin mixture which has been heated to a temperature of about 220 degrees F. It will be found that the coating will not chip or crack to expose small areas of the cheese to the atmosphere and molds, although the coated cheese may be handled at cold storage temperatures. The coating may be stripped or peeled from the cheese when desired.

We claim:

1. The method of preparing a wax-like composition adapted for coating cheese to form a coating which is pliable over a wide temperature range which comprises heating a petroleum wax to about 220° F., adding thereto up to about 10 per cent thermoplastic condensation product obtained by reacting rubber with an amphoteric metal halide, agitating the mixture until the mixture thickens, allowing the thickened mixture to stand for a short period of time and thereafter reheating the mixture to form a homogeneous mass.

2. The method of preparing a wax-like composition adapted for coating cheese to form a coating which is pliable over a wide temperature range which comprises heating paraffin to about 220° F., adding thereto thermoplastic condensation product obtained by reacting rubber with an amphoteric metal halide, agitating the mixture until the mixture thickens, allowing the thickened mixture to stand for from 15 minutes to 30 minutes and thereafter heating the mixture to about 220° F. to form a homogeneous mass.

3. The method of preparing a wax-like composition adapted for coating cheese to form a coating which is pliable over a wide temperature range, which comprises heating to about 220° F. a mixture of wax and a minor proportion of resin obtained by reacting rubber with an amphoteric halide, agitating the mixture until it thickens, allowing the thickened mixture to stand for a short period of time and reheating said mixture to about 220° F. whereby a homogeneous mass is formed.

JAMES D. INGLE.
LEON D. MINK.